(12) United States Patent
Jeng et al.

(10) Patent No.: US 7,641,884 B2
(45) Date of Patent: Jan. 5, 2010

(54) METHOD FOR FABRICATING CARBON NANOTUBES AND CARBON NANO PARTICLES

(75) Inventors: Jian-Min Jeng, Taipei (TW);
Wen-Ching Shih, Taipei (TW);
Ming-Hung Tsai, Taipei (TW);
Jyi-Tsong Lo, Taipei (TW)

(73) Assignee: Tatung Company, Taipei (TW)

(*) Notice: Subject to any disclaimer, the term of this patent is extended or adjusted under 35 U.S.C. 154(b) by 0 days.

(21) Appl. No.: 12/232,034

(22) Filed: Sep. 10, 2008

(65) Prior Publication Data
US 2009/0068085 A1 Mar. 12, 2009

(30) Foreign Application Priority Data
Sep. 10, 2007 (TW) .............................. 96133669 A (51) Int. Cl.
*D01F 9/12* (2006.01)
*C01B 31/10* (2006.01)

(52) U.S. Cl. .................. 423/447.1; 423/447.6; 997/742

(58) Field of Classification Search .............. 423/447.1, 423/447.6; 977/742
See application file for complete search history.

(56) References Cited
OTHER PUBLICATIONS

Awasthi et al. "synthesis of Carbon Nanotubes", J.Nanosci. Nanotech. 2005, 5(10), 1616-1636.*
Suda et al. "Preparation of carbon nano particles by plasma-assisted pulsed laser deposition method—size and bining energy dependence on ambient gas pressure and plasma condition", Thin Solid Films, 415 (2002), 15-20.*

* cited by examiner

*Primary Examiner*—Roy King
*Assistant Examiner*—Rebecca Lee
(74) *Attorney, Agent, or Firm*—Bacon & Thomas, PLLC (57) ABSTRACT

Disclosed is a method of fabricating carbon nanotubes and carbon nano particles, the method comprising: providing a plurality of carbon micro carriers on a silicon substrate; forming a plurality of carbon nano particles on the carbon micro carrier by a first gas; and reacting with a second gas to provide a plurality of carbon nanotubes. Thus the carbon nanotube can be formed without the use of a metal catalyst. The carbon nanotubes can easily separate from each other without the problem of non-uniformity, because the carbon micro carrier used is in a microscale size.

32 Claims, 7 Drawing Sheets

METHOD FOR FABRICATING CARBON NANOTUBES AND CARBON NANO PARTICLES

BACKGROUND OF THE INVENTION

1. Field of the Invention

The present invention relates to a method for fabricating carbon nanotubes and carbon nano particles, and more particularly, to a method for fabricating carbon nanotubes and carbon nano particles which can easily separate from each other.

2. Description of Related Art

Carbon nanotube is a key-material for nano-technology, but for the recent technology, the cost of manufacturing industrial carbon nanotube is still very high.

In today's main carbon nanotube process, a silicon, $SiO_2$ or $Al_2O_3$ substrate is first provided, which is filled with metal-catalyst. The metal-catalyst, having transitional metals such as Fe, Co, Ni, or alloys thereof, is a metal film deposited by coating process, and then the catalyzed metal film is converted into nano-size metal-catalyst particles. Afterwards, the substrate having metal-catalyst particles is placed into a CVD (chemical vapor deposition) system or MPCVD (microwave-plasma-enhanced chemical vapor deposition) system and exposed to carbon-containing gases (e.g. acetylene, methane), so as to make carbon-containing gases pyrolysize at high temperature or ionize into carbon, then the carbon can be absorbed to the surface of the metal-catalyst particles and is deposited to provide a carbon nanotube.

However, the substrate using metal-catalysts should form a plurality of holes on the surface of the substrate, and those metal-catalysts should be placed into holes, so the process widely increases the difficulties, complexity, and cost of manufacturing.

On the other hand, after the growing of the carbon nanotube, the carbon nanotube collected from the substrate can be further mixed with conductive metal-paste (e.g. silver paste), followed by using a screen-printing process to coat onto another substrate, which is then applied to the cathode of the large-size field emission display panel. Hence the problem that the carbon nanotube aggregates and is not easily separated because of the aspect ratio and the nanoscale of the carbon nanotube, result in decreasing the uniformity of the carbon nanotube. As can be seen, non-uniform distribution of the carbon nanotube will cause great non-uniformity of field emission current, which may further influence the brightness quality of field emission display panel.

SUMMARY OF THE INVENTION

One of the objects according to the present invention is to provide a method for fabricating carbon nanotubes and carbon nano particles, the method makes carbon nanotubes that easily separate from each other.

Another object according to the present invention is to provide a method for producing carbon nanotubes and carbon nano particles, wherein the method is able to grow a carbon nanotube without using metal-catalyst.

To obtain the above-mentioned objects, the present invention provides a method for fabricating carbon nanotubes, comprising the following steps: (A) providing a plurality of carbon micro carriers on a silicon substrate; (B) forming a plurality of carbon nano particles on the carbon micro carrier by a first gas; and (C) reacting with a second gas to provide a plurality of carbon nanotubes.

To obtain the above-mentioned objects, the present invention provides a method for fabricating carbon nano particles suitable for applying at a plurality of carbon micro carriers, comprising the following steps: (A) providing a plurality of carbon micro carriers on a silicon substrate; (B) forming a plurality of carbon nano particles on the carbon micro carriers by a gas.

According to the present invention, the size of the above-mentioned carbon micro carrier is preferably in a micron scale size, e.g. the size in a range of 0.1 micrometer to several micrometers or above, and the carbon micro carrier is uniformly provided on the silicon substrate by using a solution, wherein the solvent of the solution is preferably ethylene cellulose, and the solute is preferably a carbon micro carrier. Afterwards, heat-treatment can be provided to the silicon substrate to remove the solvent, thus the carbon micro carrier is uniformly formed on the substrate, and the temperature used here is preferably 360~500° C. The material of the carbon micro carrier can use any material having carbon atoms, and preferably uses graphite. The size of the carbon micro carrier is preferably in a micron scale size, e.g. the size in a range of 0.1 micrometer to several micrometers, to enable the carbon micro carrier to be uniformly formed on the silicon substrate.

The above-mentioned carbon nano particles is preferably formed on the carbon micro carrier after being filled with a first gas, the size of the carbon nano particle is preferably 1 nanometer to several tens of nanometers, and the first gas can be in a molecular or a plasma state. If the first gas is in a molecular state, it can be any carbon-containing gas, which is provided from reaction caused by heat treatment applying to the carbon atoms, preferably a gas including at least a hydrogen atom, such as $H_2$ or $NH_3$. When filled with the molecular first gas, the silicon substrate can be heated to 500~700° C. to make the first gas react with the carbon micro carrier to provide carbon nano particles. If the first gas is $H_2$, it is conducted to a chamber of a heated silicon substrate. The silicon substrate is heated to and over 600° C. in order to provide $H_2$ and graphite with enough energy to react and form carbon nano particles. On the other hand, if the first gas is in a plasma state, it can be hydrogen plasma or oxygen plasma. The micro carrier collides with the first gas of a plasma state, hence the carbons of the carbon micro carrier is bombarded out by the collision of the micro carrier with the first gas of a plasma state, then the carbon clusters of the micro carrier adheres on the micro carrier to form these carbon nano particles.

The above-mentioned carbon nanotube is preferably formed starting with carbon nano particles, followed by using a CVD (chemical vapor deposition) method with a second gas to deposit on the carbon micro carrier, wherein the second gas is preferably methane, hydrogen gas, acetylene, or ammonia gas, and more preferably is acetylene. When exposed to the second gas, the silicon substrate can be heated to the temperature of 550~950° C.

Therefore, the present invention provides a carbon micro carrier on the silicon substrate, then forms carbon nano particles on such carbon micro carrier by the first gas, and followed by filling with the second gas to perform a carbon nanotube on the carbon micro carrier, thus growing a carbon nanotube without the use of metal catalyst. Besides, the carbon micro carrier particles can disperse uniformly in the solution to make carbon nanotubes easily separate from each other.

DETAILED DESCRIPTION OF THE PREFERRED EMBODIMENTS

Figure 1:
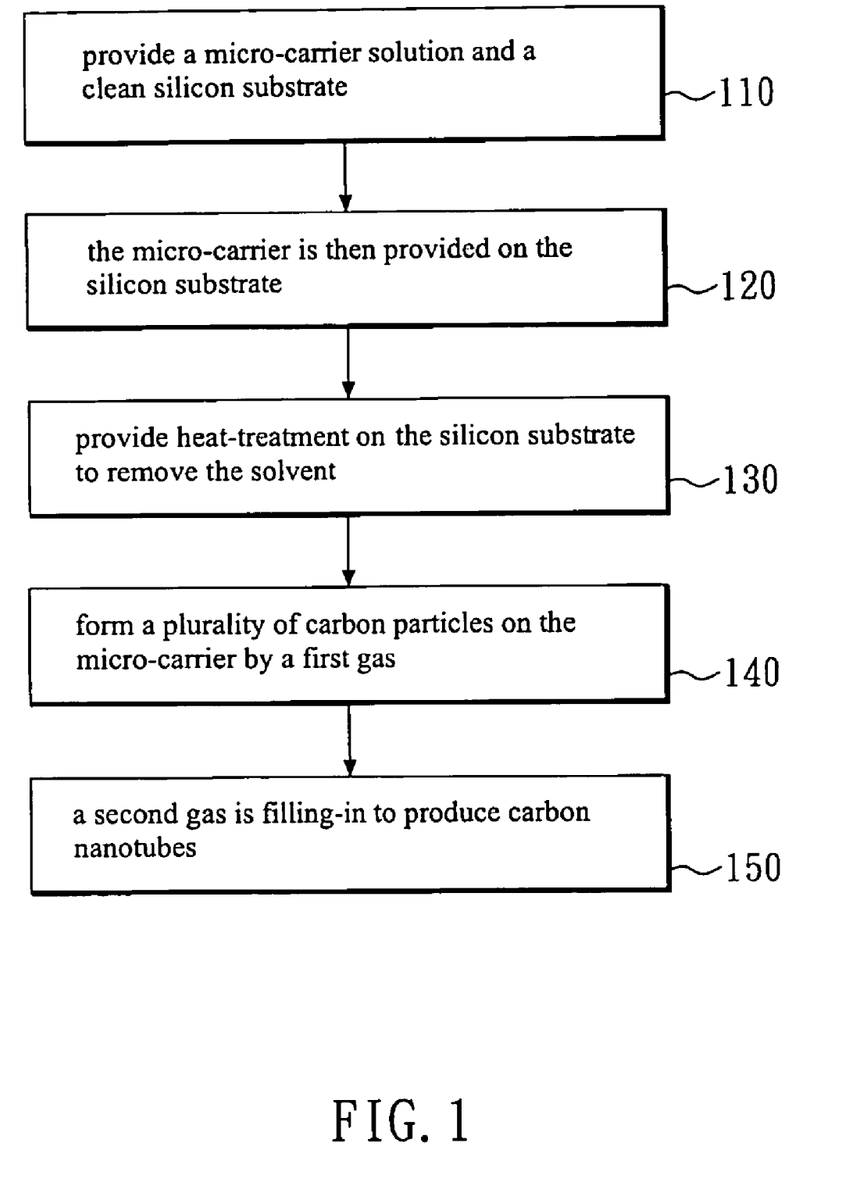
FIG. 1 is a schematic flow chart showing a preparation process of the carbon nanotube according to a preferred embodiment of the present invention.

As shown in FIG. 1, which is a schematic flow chart showing a preparation process of the carbon nanotube according to the present embodiment, a carbon micro carrier solution and a clean silicon substrate (step 110) are provided first. Here, the carbon micro carrier solution is prepared from mixing an ethylene cellulose solution and a carbon micro carrier solute; the impurities on the silicon substrate are cleaned by de-ionized water. In the present embodiment, the carbon micro carrier is graphite, the size of which is in a micron scale size (e.g. the size in a range of 0.1 micrometer to several micrometers), but in the other preferably embodiments, the carbon micro carrier can be other materials having carbon atoms, also the size thereof can be greater than that of the present embodiment.

Referring to FIG. 1, the carbon micro carrier is then uniformly provided on the silicon substrate (step 120). The step here uses a spin-coater to drop the prepared carbon micro carrier solution on the silicon substrate and spin-coat the prepared carbon micro carrier solution uniformly on the cleaned silicon substrate. There is no limit on the coating equipment (e.g. spin-coater), other devices also can be used to provide the carbon micro carrier solution on the silicon substrate.

Figure 6:
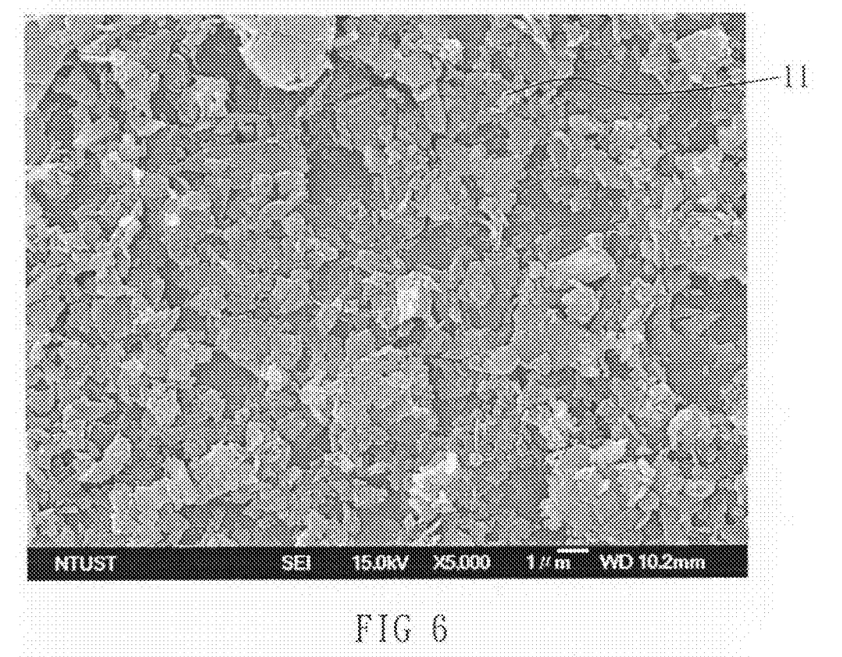
FIG. 6 is an SEM photograph of a carbon micro carrier on a silicon substrate in a preferred embodiment of the present invention.

Then, heat-treatment is provided on the spin-coated silicon substrate to remove the solvent of the carbon micro carrier solution, wherein the solvent here is ethylene cellulose (step 130). In the present embodiment, the spin-coated silicon substrate is heated to 360~500° C. in order to remove the solvent of the carbon micro carrier solution and keep the carbon micro carrier on the silicon substrate. However, in the other embodiments, the temperature depends upon the content of the carbon micro carrier solution. FIG. 6 is an SEM photograph of a carbon micro carrier on a silicon substrate 11 after the present step.

Figure 2:
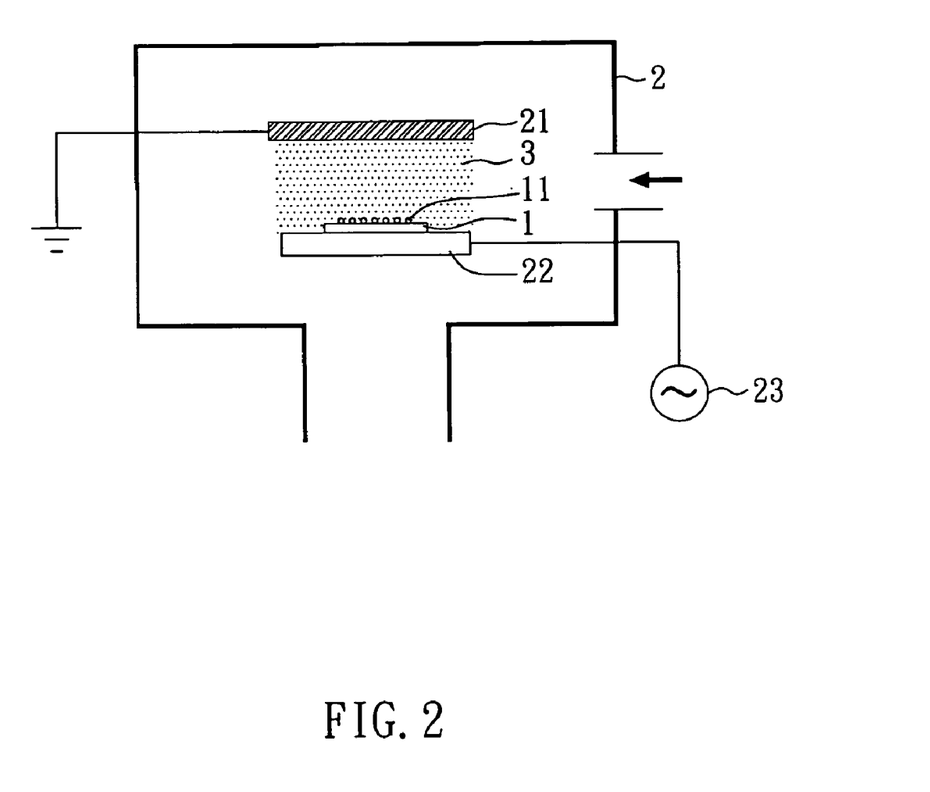
FIG. 2 is a schematic view of the system of plasma treatment, which is used in the preferred embodiment of the present invention.
Figure 3:
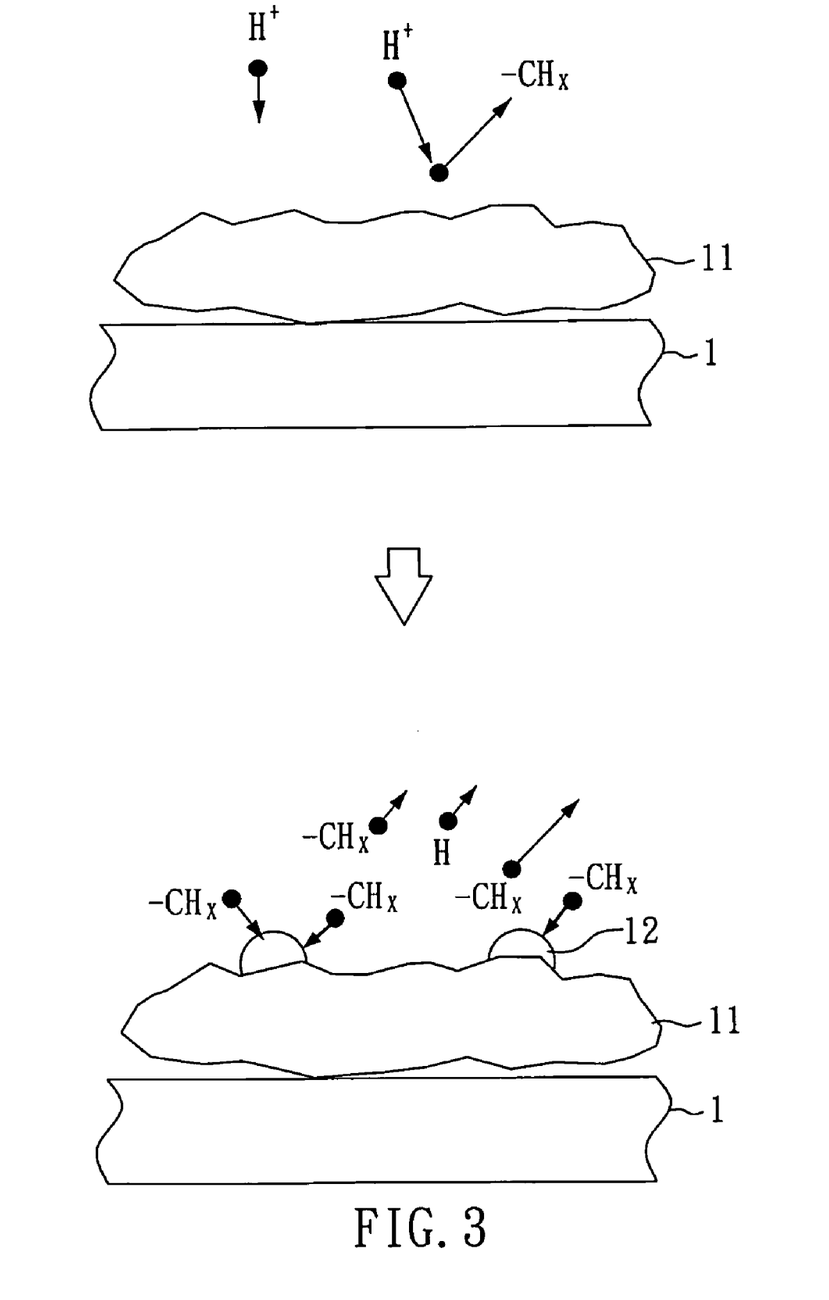
FIG. 3 is a schematic view of a process forming a carbon nano particle in a preferred embodiment of the present invention.
Figure 7:
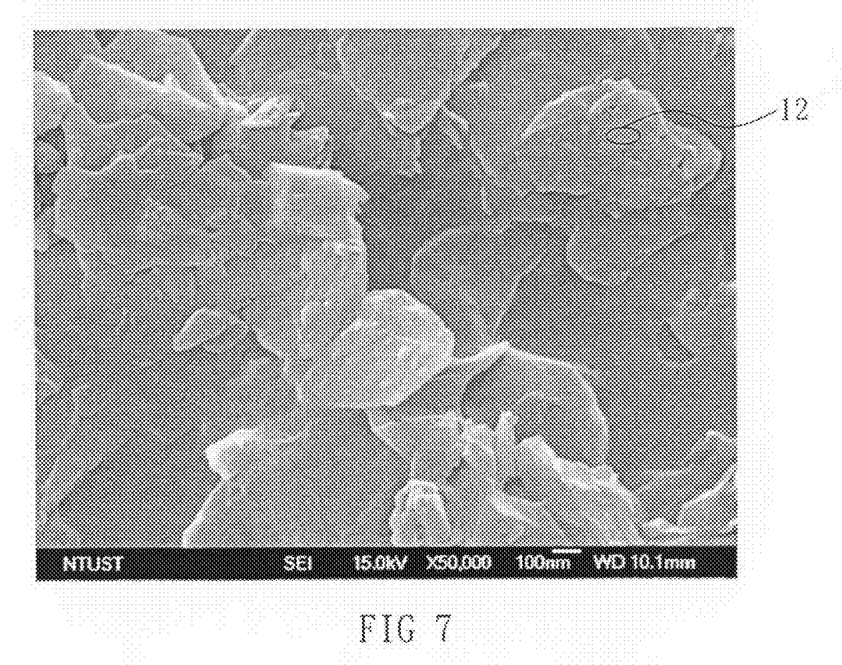
FIG. 7 is an SEM photograph of a carbon nano particle provided in a preferred embodiment of the present invention.

Next, a plurality of carbon nano particles is formed on the carbon micro carrier by a first gas (step 140). The first gas can be in a molecular state or in a plasma state. If the first gas is in a molecular state, it can be any carbon-containing gas, which is provided from reaction caused by heat treatment applied to the carbon atom, preferably a gas including at least one hydrogen atom, such as hydrogen gas or ammonia gas. If the first gas is in a plasma state, it can be hydrogen plasma or oxygen plasma. Referring to FIGS. 2 and 3, FIG. 2 is a schematic view of the system of plasma treatment used in the present step, and FIG. 3 shows a process forming a carbon nano particle in the present step. As can be seen in FIG. 2, the silicon substrate 1 heated by the step mentioned above is placed in a chamber 2. In the present embodiment, if the first gas is a hydrogen plasma ($H^+$), it is produced from the hydrogen gas along the arrowhead direction into chamber 2, which has an anode 21, a cathode 22 and a silicon substrate 1 placed on the cathode 22, and the hydrogen gas feed between anode 21 and cathode 22 is then dissociated into hydrogen plasma ($H^+$) 3 by the cathode 22 connected to a R.F. power source 23. The hydrogen plasma 3 affected by the electric field of the chamber 2 then moves toward the cathode 22 and collides with the carbon micro carrier 11 of the silicon substrate 1, thus bombarded out the carbon atom of the carbon micro carrier 11 to form compounds having a formula of $—CH_x$. Some compounds having a formula of $—CH_x$ are attached to the nearby carbon micro carrier 11 to provide carbon nano particles 12. Also, if the first gas is a hydrogen gas in the present embodiment, the hydrogen gas fills directly to the silicon substrate, then the silicon substrate is heated to over 600° C. to provide enough energy for reacting the hydrogen gas and the graphite, thus a carbon nano particle is formed. As shown in FIG. 7, the carbon nano particle 12 is formed after the present step.

Figure 4:
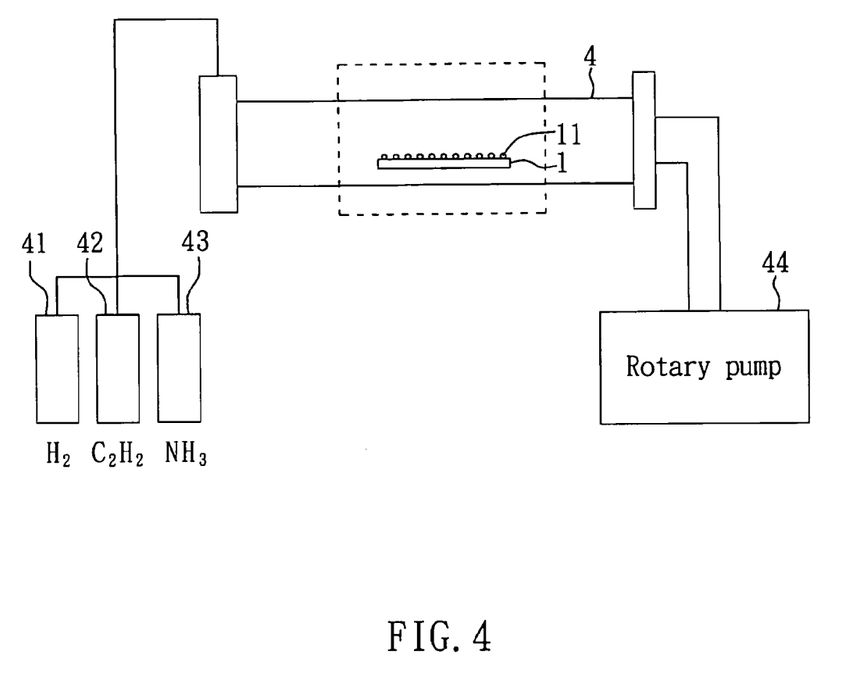
FIG. 4 is a schematic view of the equipment used in a preferred embodiment of the present invention.
Figure 8:
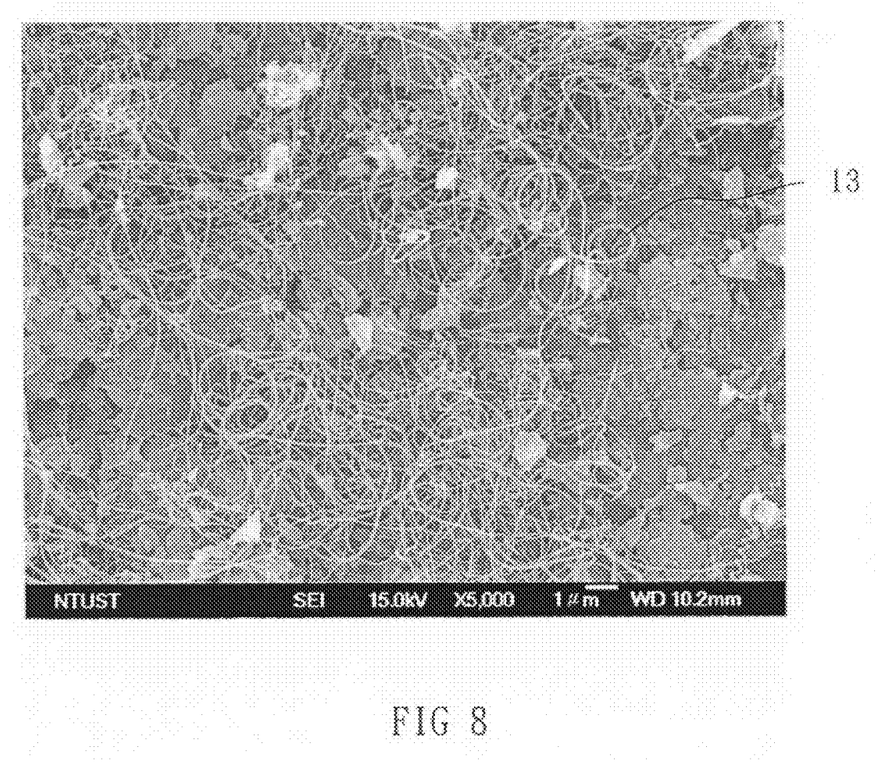
FIG. 8 is an SEM photograph of a carbon nanotube provided in a preferred embodiment of the present invention.

Thereafter, the silicon substrate 1 is placed in a chamber and a second gas is filling-in to produce a plurality of carbon nanotubes (step 150). A schematic view of the equipment used in the present embodiment is shown in FIG. 4. As can be seen, the carbon nanotube is formed by thermo chemical vapor deposition. A silicon substrate 1 having a carbon nano particle (not shown) is placed in a chamber 4, and a second gas is filled in this chamber 4. The second gas used here is hydrogen gas, acetylene and ammonia gas, therefore one side of the chamber 4 connects with a hydrogen gas source 41, an acetylene source 42 and an ammonia gas source 43, and the other side of the chamber 4 connects with a rotary pump 44 for helping the second gas to smoothly flow into the chamber 4. Also, the above acetylene may be replaced with methane. The second gas causes a chemical reaction on the carbon micro carrier 11 by heating the silicon substrate 1 to the temperature of 550~950° C. Then carbon nano particles are used as starting material to provide carbon nanotubes 13 on the carbon micro carrier 11 (shown in FIG. 8). An SEM photograph of a carbon nanotube provided after the present step is shown in FIG. 8.

Therefore, when using this carbon nanotube 13, the carbon micro carrier 11 and the carbon nanotube 13 can together take-off and then mix with a conducting paste (not shown) to produce a screen printing slurry. Because some carbon nanotubes 13 of the present invention are attached to the microscale carbon micro carrier 11, the carbon nanotubes 13 easily disperse in the conducting paste without non-uniformity.

Figure 5:
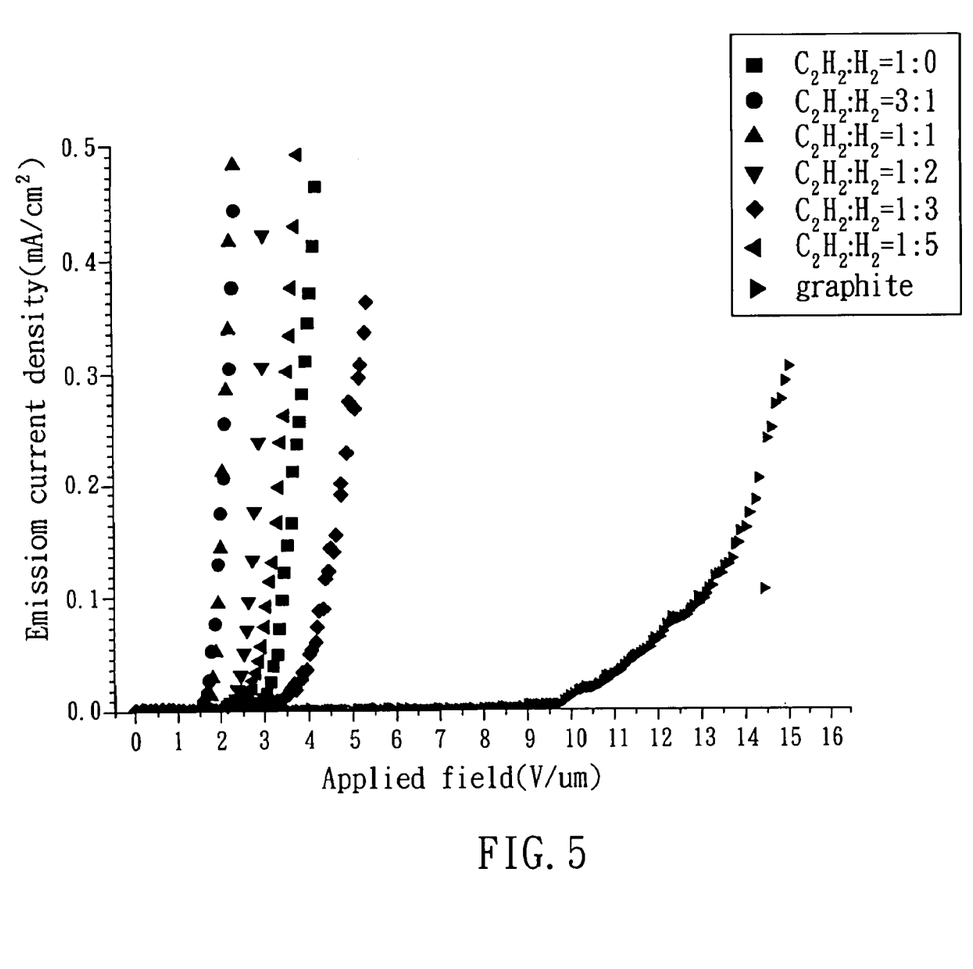
FIG. 5 is a graph showing field emission current density and applied field voltage characteristic when the carbon nanotube of the present invention is applied to a field emission cathode.

As shown in FIG. 5, which is a graph showing field emission current density and applied field voltage characteristic when the carbon nanotube of the present invention is applied to a field emission cathode, the mole ratio of acetylene and hydrogen gas in the second gas used in the present invention may affect the efficiency of the field emission, and the field emission current density graph shows that the carbon nanotube is indeed formed on the carbon micro carrier after the above step.

Therefore, as can be seen from the above mentioned description, the present invention provides a carbon micro carrier on the silicon substrate, and then forms carbon nano particles on such carbon micro carrier by the first gas, followed by filling with the second gas to perform a carbon nanotube on the carbon micro carrier, thus growing a carbon nanotube without the use of metal-catalyst. Besides, the carbon micro carrier particles can disperse uniformly in the solution whereby carbon nanotubes easily separate from each other.

From the foregoing description, the present invention owns differences from conventional technology in several ways, such as purpose, method, function, technology, research and design. Although the present invention has been explained in relation to its preferred examples, it is to be understood that many other possible modifications and variations can be made without departing from the scope of the invention as hereinafter claimed.

What is claimed is:

1. A method of preparing carbon nanotubes, comprising:
   (A) providing a plurality of carbon micro carriers on a silicon substrate;
   (B) heating the silicon substrate in a first gas and forming a plurality of carbon nano particles from the carbon micro carriers by the first gas; and
   (C) reacting with a second gas to provide a plurality of carbon nanotubes.

2. The method of preparing carbon nanotubes as claimed in claim 1, wherein the carbon micro carrier in step (A) is provided uniformly on the silicon substrate by a solvent.

3. The method of preparing carbon nanotubes as claimed in claim 2, wherein the solvent is ethylene cellulose.

4. The method of preparing carbon nanotubes as claimed in claim 2, wherein step (A) further comprises a step of heating the silicon substrate to remove the solvent.

5. The method of preparing carbon nanotubes as claimed in claim 1, wherein the size of the carbon micro carrier is in a range of 0.1 micrometer to several micrometers.

6. The method of preparing carbon nanotubes as claimed in claim 1, wherein the material of the carbon micro carrier is a carbon-containing material.

7. The method of preparing carbon nanotubes as claimed in claim 1, wherein the carbon micro carrier is graphite.

8. The method of preparing carbon nanotubes as claimed in claim 1, wherein the size of the carbon nano particle is in a range of 1 to several tens of nanometers.

9. The method of preparing carbon nanotubes as claimed in claim 1, wherein the first gas is at a molecular state.

10. The method of preparing carbon nanotubes as claimed in claim 9, wherein the first gas includes at least one hydrogen atom.

11. The method of preparing carbon nanotubes as claimed in claim 9, wherein step (B) provides such carbon nano particles from reaction caused by heat treatment applying to the carbon atom of the carbon micro carrier.

12. The method of preparing carbon nanotubes as claimed in claim 1, wherein the first gas is selected from the group consisting of hydrogen gas ($H_2$) and ammonia gas ($NH_3$).

13. The method of preparing carbon nanotubes as claimed in claim 1, wherein the first gas is at a plasma state.

14. The method of preparing carbon nanotubes as claimed in claim 1, wherein the first gas is a gas selected from the group consisting of hydrogen plasma and oxygen plasma.

15. The method of preparing carbon nanotubes as claimed in claim 13, wherein in step (B), the carbon micro carrier collides with the first gas to make a plurality of carbons bombarding out, then a plurality of carbon clusters adhere on the carbon micro carrier to form these carbon nano particles.

16. The method of preparing carbon nanotubes as claimed in claim 1, wherein the second gas is selected from the group consisting of methane, hydrogen gas, acetylene, and ammonia gas.

17. The method of preparing carbon nanotubes as claimed in claim 1, wherein step (C) further comprises a heat treatment, which is heating the silicon substrate in the second gas.

18. A method of preparing carbon nano particles by using a plurality of micro carriers on a silicon substrate; and
   (B) heating the silicon substrate in a gas, and forming a plurality of carbon nano particles from the carbon micro carriers by the gas.

19. The method of preparing carbon nano particles as claimed in claim 18, wherein the carbon micro carrier in step (A) is provided uniformly on the silicon substrate by a solvent.

20. The method of preparing carbon nano particles as claimed in claim 19, wherein the solvent is ethylene cellulose.

21. The method of preparing carbon nano particles as claimed in claim 19, wherein step (A) further comprises a step of heating the silicon substrate to remove the solvent.

22. The method of preparing carbon nano particles as claimed in claim 18, wherein the size of the carbon micro carrier is in a range of 0.1 micrometer to several micrometers.

23. The method of preparing carbon nano particles as claimed in claim 18, wherein the material of the carbon micro carrier is a carbon-containing material.

24. The method of preparing carbon nano particles as claimed in claim 18, wherein the carbon micro carrier is graphite.

25. The method of preparing carbon nano particles as claimed in claim 18, wherein the size of the carbon nano particle is in a range of 1 to several tens nanometers.

26. The method of preparing carbon nano particles as claimed in claim 18, wherein the gas is at a molecular state.

27. The method of preparing carbon nano particles as claimed in claim 26, wherein the gas includes at least one hydrogen atom.

28. The method of preparing carbon nano particles as claimed in claim 26, wherein step (B) provides such carbon nano particles from reaction caused by heat treatment applied to the carbon atom of the carbon micro carrier.

29. The method of preparing carbon nano particles as claimed in claim 18, wherein the gas is selected from the group consisting of hydrogen gas and ammonia gas.

30. The method of preparing carbon nano particles as claimed in claim 18, wherein the gas is at a plasma state.

31. The method of preparing carbon nano particles as claimed in claim 30, wherein the gas is a gas selected from the group consisting of hydrogen plasma and oxygen plasma.

32. A method of preparing carbon nano particles as claimed in claim 30, where in step (B), the micro carrier collides with the gas to make a plurality of carbon bombarding out, and then carbon clusters adhere to the carbon micro carrier to form these carbon nano particles.

* * * * *